June 5, 1928.
C. F. BALL
1,672,050
NONSKID CHAIN ATTACHMENT FOR TRUCKS
Filed Oct. 25, 1922  2 Sheets-Sheet 1
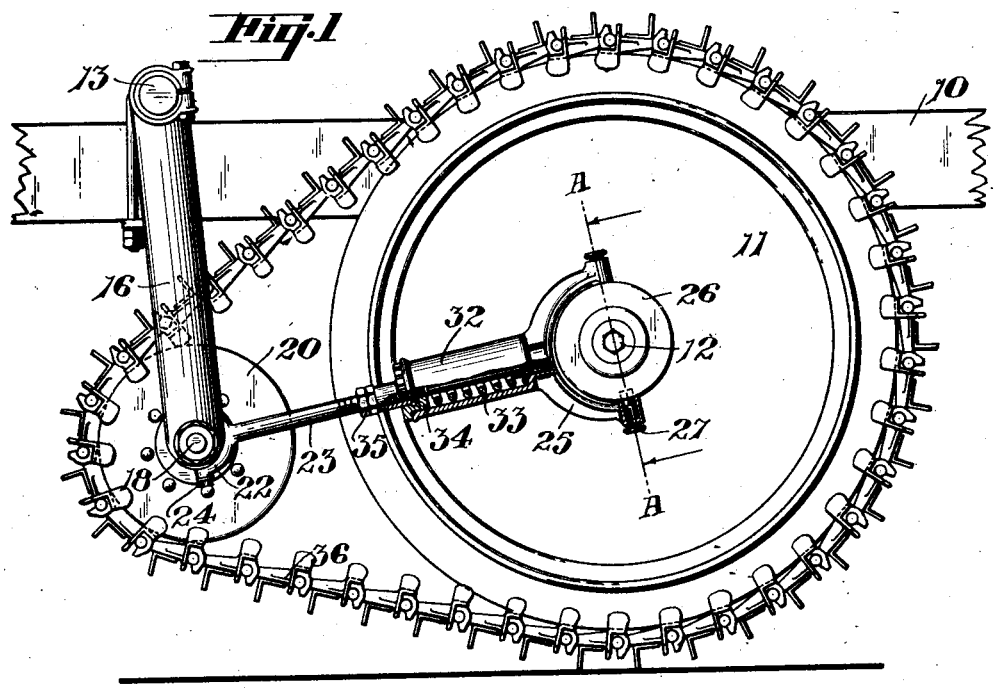
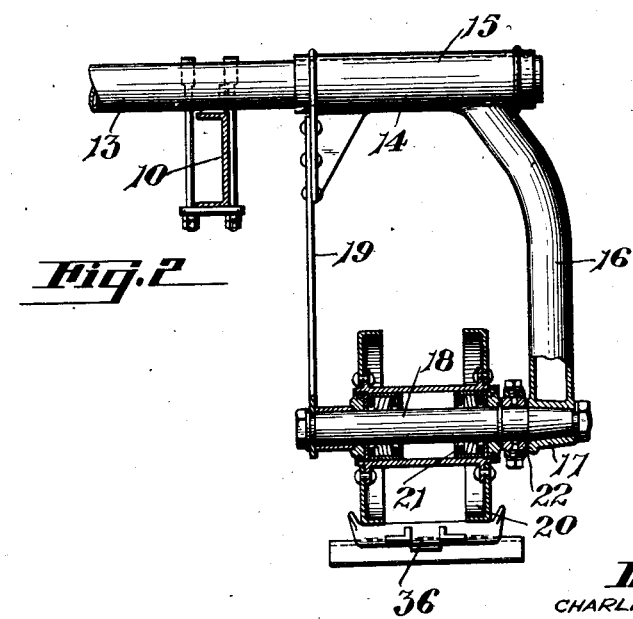
Inventor.
CHARLES F. BALL.
By Dewey, Strong,
Townsend and Loftus
Attorneys.

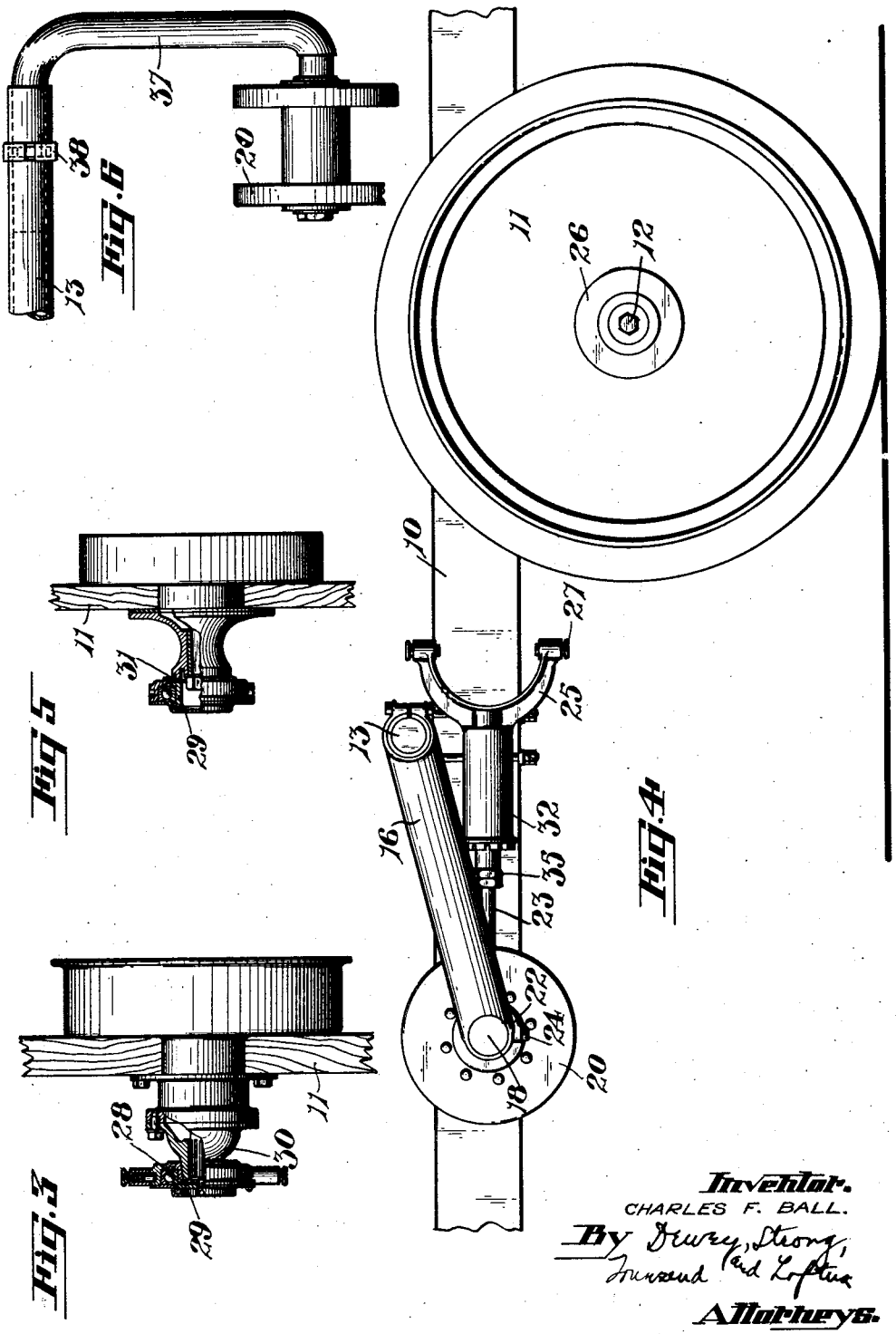

Patented June 5, 1928.

1,672,050

UNITED STATES PATENT OFFICE.

CHARLES F. BALL, OF MILWAUKEE, WISCONSIN.

NONSKID CHAIN ATTACHMENT FOR TRUCKS.

Application filed October 25, 1922. Serial No. 596,795.

This invention relates to endless tread attachments for motor vehicles and the like.

In the application of an endless tread belt or chain track to the drive wheels of a motor vehicle provision must be made for mounting an idler wheel in front of the drive wheel and maintaining the tension on the track in a proper manner. The idler wheel should be so mounted upon the frame of the vehicle that it may be moved out of the way when not in use. This requires the use of a swinging hanger for the idler wheel, and, in order to support the said hanger to tension the track, a radius rod is arranged between the axle of the drive wheel and the axle of the idler wheel. However, it is not possible in any of the standard types of rear axles to place a radius rod inside the drive wheel, due to the presence of brake bands, etc. If provision could be made for using a single radius rod placed outside the wheel, then the attachment is applicable to any of the standard types of rear axles without altering the latter.

In prior devices with which I am familiar wherein it has been proposed to use radius rods of this character, it is not possible to use a single outside radius rod owing to the fact that the hanger which suspends the idler wheel is so arranged as to require support at both sides of the idler wheel.

The present invention has for its object to provide a mounting of the type mentioned using a single radius rod which may be placed outside the wheel so as to be applicable to any of the standard types of axles without altering the latter. A radius rod so positioned is readily accessible and means can be provided for quickly and easily detaching it from the wheel hub, so that the idler wheel may be swung out of the way when the tread attachment is not in use.

In the accompanying drawings, Fig. 1 shows a side elevation of a rear end of a motor truck fitted with an attachment embodying my invention.

Fig. 2 shows a front elevation, partly in section, of the idler wheel and its mounting.

Fig. 3 shows a sectional view on the line A—A of Fig. 1.

Fig. 4 shows a side elevation of the device of Fig. 1 in folded or inoperative position.

Fig. 5 shows a sectional view of a modified form of connection between the radius rod and wheel hub.

Fig. 6 shows a front elevation of a modified form of swinging hanger.

Referring in detail to the accompanying drawings, I show a vehicle frame 10, drive wheel 11 and axle 12, all of conventional design. Extending across the vehicle frame and projecting at each side thereof is a supporting member 13, preferably in the form of a tubular shaft. On each end of this supporting member there is pivotally mounted a hanger 14. This hanger in its preferred form comprises a pivot member 15 in the form of an elongated sleeve at the outer end of which is a hanger bar 16 of a size and shape to resist torsional strains. The hanger bar at its lower end has a bearing box 17 into which is fitted an axle 18. The opposite end of the axle may be stayed by a hanger bar 19 which extends up to the inner end of the sleeve 15. This bar 19, however, may be omitted entirely, if desired.

An idler wheel 20 is journaled on the axle 18, roller bearings 21 being provided if desired. Positioned on the axle 18 between the idler wheel and the hanger bar 16 is a rotatable collar 22 to which is connected the forked end of a radius rod 23 by means of screws 24. The radius rod extends back to the rear axle and has on its rear end a block or yoke 25 connected to a rotatable collar 26 by means of spring-pressed pins 27, said collar surrounding the hub of the drive wheel. This collar 26 is preferably carried by ball bearings 28 upon a ring 29 which fits over and is carried by the hub of the drive wheel. In Fig. 3 the ring 29 is fitted directly on to the hub cap 30, but in Fig. 5 the said ring 29 is made to serve as a substitute for the regular hub cap by providing a screw-threaded flange 31 thereon.

The radius rod is preferably formed in two parts, one comprising a cylinder 32 carrying a helical spring 33 and the other part having a head 34 to fit slidably in the cylinder, and work against the spring. This head preferably has a screw-threaded connection 35 with its rod, so that it can be adjusted to vary the length of the radius rod.

An endless tread belt or chain track 36 of any desired construction is arranged upon the drive wheel 11 and idler wheel 20. In the operation of the attachment the hanger shown and described herein will, despite the fact that only a single radius rod is employed, afford sufficient strength to resist the torsional strains incident to the operation of the track or tread. The spring connection in the radius rod will permit the idler wheel to move with relation to the drive wheel, so as to relieve the track of excessive strains in case an obstruction falls between one of the wheels and the track.

The radius rod being at the outside of the wheel is readily accessible and it can be quickly detached from the wheel hub by removing the inner stationary ring 29 or by disconnecting the pins 27 from the rotating collar 26. When so disconnected the track may be removed and the idler swung up to the position shown in Fig. 4, where it will not afford any obstruction to the normal operation of the vehicle. The radius rod may be swung into parallel relation with the vehicle frame by reason of the rotating collar 22 which connects it to the axle of the idler wheel, or, if desired, the radius rod may be entirely disconnected from the said idler wheel axle.

Owing to the size and shape of the hanger bar 16 I have found that a single radius rod placed at the outside will be sufficient to support the idler wheel against the pull and strains imposed thereon by the track.

A modification of the hanger is shown in Fig. 6 wherein a U-shaped member 37 is provided, one end of which fits rotatably within the tubular cross shaft 13, being held therein by a locking ring 38 and the other end of said U-shaped member 37 forming the axle for the idler wheel.

Various changes in the construction and arrangement of the several parts herein shown and described may be employed without departing from the spirit of my invention as disclosed in the appended claims.

The radius rod has a lateral pivotal motion where the yoke connects. Such action is desirable in order to accommodate the side sway between the ground wheel and idler wheel caused by the action of the vehicle springs.

Having thus described my invention, what I claim and desire to secure by Letters Patent is:—

1. An endless tread attachment for the drive wheel of a motor vehicle comprising an idler wheel and a mounting therefor including a hanger pivotally connected to the vehicle frame and carrying an axle for the idler wheel, and a radius rod rotatably connected to the axle of the idler wheel and rotatably and detachably connected to the outer end of the hub of the drive wheel, said hanger including an elongated pivot member parallel to the axle of the idler wheel and a hanger bar connecting said pivot member and axle at one end, said hanger bar being of a size and shape to resist torsional strains incident to the operation of the tread.

2. An endless tread attachment for the drive wheel of a motor vehicle comprising an idler wheel and a mounting therefor including a hanger pivotally connected to the vehicle frame and carrying an axle for the idler wheel, and a radius rod rotatably connected to the axle of the idler wheel and rotatably and detachably connected to the outer end of the hub of the drive wheel, said radius rod having telescoping parts with a spring interposed between said parts to permit the idler wheel to move relatively to the drive wheel.

3. An endless tread attachment for the drive wheel of a motor vehicle comprising an idler wheel and a mounting therefor including a hanger pivotally connected to the vehicle frame and carrying an axle for the idler wheel, a radius rod rotatably connected to the axle of the idler wheel and rotatably and detachably connected to the outer end of the hub of the drive wheel, a connection between the radius rod and drive wheel hub comprising an inner ring to fit detachably on the hub and a collar rotatably mounted on the inner ring.

4. In an endless tread attachment for the drive wheel of a motor vehicle, the combination of a swinging hanger having a pivot member for connection with the vehicle frame, a bar extending at right angles therefrom, an axle connected to the opposite end of the bar and parallel with the said pivot member, an idler wheel journaled on said axle, a collar rotatably mounted on the axle between the idler wheel and hanger bar, a radius rod connected to said collar and means on the outer end of the hub of the drive wheel for receiving the opposite end of said radius rod, said means comprising an inner ring detachably fitted on the hub of the drive wheel and a collar rotatably mounted on said ring.

CHARLES F. BALL.